United States Patent
Fay

(10) Patent No.: US 11,917,089 B2
(45) Date of Patent: Feb. 27, 2024

(54) REDUCING HELPER DATA SIZE FOR PHYSICAL UNCLONABLE FUNCTION DEVICE

(71) Applicant: NXP B.V., Eindhoven (NL)

(72) Inventor: Björn Fay, Brande-Hörnerkirchen (DE)

(73) Assignee: NXP B.V., Eindhoven (NL)

( * ) Notice: Subject to any disclaimer, the term of this patent is extended or adjusted under 35 U.S.C. 154(b) by 352 days.

(21) Appl. No.: 17/488,124

(22) Filed: Sep. 28, 2021

(65) Prior Publication Data
US 2023/0094237 A1    Mar. 30, 2023

(51) Int. Cl.
*H04L 9/32* (2006.01)
*G11C 11/41* (2006.01)
*G11C 11/419* (2006.01)

(52) U.S. Cl.
CPC .......... *H04L 9/3278* (2013.01); *G11C 11/419* (2013.01)

(58) Field of Classification Search
None
See application file for complete search history.

(56) References Cited

U.S. PATENT DOCUMENTS

| | | | |
|---|---|---|---|
| 6,377,500 B1 * | 4/2002 | Fujimoto | G06F 12/0246 365/230.01 |
| 8,516,269 B1 | 8/2013 | Hamlet et al. | |
| 8,667,265 B1 | 3/2014 | Hamlet et al. | |
| 8,848,905 B1 | 9/2014 | Hamlet et al. | |
| 8,868,923 B1 | 10/2014 | Hamlet et al. | |
| 10,554,398 B2 | 2/2020 | Van Der Leest et al. | |
| 11,233,663 B1 * | 1/2022 | Hoefler | H04L 9/0866 |
| 11,296,897 B2 * | 4/2022 | Endress | G06V 20/80 |
| 2019/0026457 A1 | 1/2019 | Plusquellic et al. | |
| 2020/0358609 A1 * | 11/2020 | Kwak | H04L 9/0877 |
| 2021/0143994 A1 | 5/2021 | Fay | |

OTHER PUBLICATIONS

Hiller, Matthias et al. "Cherry-Picking Reliable PUF Bits With Differential Sequence Coding", IEEE Transactions on Information Forensics and Security, vol. 11, No. 9, Sep. 2016, pp. 2065-2076.

* cited by examiner

*Primary Examiner* — Tan T. Nguyen

(57) ABSTRACT

Embodiments of a physical unclonable function (PUF) device and a method for generating helper data for a PUF device with an array of cells are disclosed. In an embodiment, the PUF device comprises an array of cells, wherein each cell of the array generates an output signal, a reliable cell group detector coupled to the array of cells to find reliable groups of cells in the array of cells having sufficient reliable cells and output addresses of the reliable groups of cells, and a storage device coupled to the reliable cell group detector to store the addresses of the reliable groups of cells to be used as helper data for PUF response operations.

20 Claims, 9 Drawing Sheets

REDUCING HELPER DATA SIZE FOR PHYSICAL UNCLONABLE FUNCTION DEVICE

BACKGROUND

A usual way of constructing physical unclonable functions (PUFs) is to have some physical sources which have some uncontrollable process variations and use them to generate stable and die-individual secret information. These physical sources may be cells, such as static random-access memory (SRAM) cells, that each generates a value. The quality of these cells or their generated values can be tested to select appropriate cells to be used for the PUFs to generate the secret information. The data regarding these selected cells is commonly referred to as helper data, which needs to be stored on chip so that the selected cells are used again at reconstruction to generate the same secret information again. One very simple approach would be to store a bitmap of all cells, which indicate which cells are good, and use this bitmap as the helper data. Another approach would be to store only the addresses of the good cells as the helper data, which may reduce the size of the helper data. However, both of these approaches require significant amount of data to be stored on-chip, for example, in one time programmable (OTP) fuses on devices that do not have other internal non-volatile memory, such as flash memory or EEPROM (Electrically Erasable Programmable Read-Only Memory). Thus, there is a need to reduce helper data size for PUFs.

SUMMARY

Embodiments of a physical unclonable function (PUF) device and a method for generating helper data for a PUF device with an array of cells are disclosed. In an embodiment, the PUF device comprises an array of cells, wherein each cell of the array generates an output signal, a reliable cell group detector coupled to the array of cells to find reliable groups of cells in the array of cells having sufficient reliable cells and output addresses of the reliable groups of cells, and a storage device coupled to the reliable cell group detector to store the addresses of the reliable groups of cells to be used as helper data for PUF response operations.

In an embodiment, a PUF device comprises an array of cells, wherein each cell of the array generates an output signal, a reliable cell group detector coupled to the array of cells to find reliable groups of cells in the array of cells having sufficient reliable cells and output addresses of the reliable groups of cells, and a storage device coupled to the reliable cell group detector to store the addresses of the reliable groups of cells to be used as helper data for PUF response operations.

In an embodiment, the reliable groups of cells are reliable blocks of cells in the array of cells and the reliable cell group detector is configured to examine each block of cells in the array of cells to determine whether the block of cells has sufficient number of reliable cells to be considered a reliable block of cells.

In an embodiment, the reliable groups of cells are reliable sub-blocks of cells of particular blocks of cells in the array of cells and the reliable cell group detector is configured to examine each sub-block of cells in the array of cells to determine whether the sub-block of cells has sufficient number of reliable cells to be considered a reliable sub-block of cells.

In an embodiment, the reliable groups of cells are reliable sets of cells in sub-blocks of cells of particular blocks of cells in the array of cells and the reliable cell group detector is configured to examine each set of cells in the array of cells to determine whether the set of cells has sufficient number of reliable cells to be considered a reliable set of cells.

In an embodiment, the sets of cells are pairs of cells in the sub-blocks of cells of the particular blocks of cells in the array of cells.

In an embodiment, each of the reliable groups of cells are cells positioned according to an offset pattern.

In an embodiment, some of the reliable groups of cells are positioned according to overlapping patterns.

In an embodiment, the reliable cell group detector determines that a group of cells is a reliable group of cells when all the cells in the group are reliable.

In an embodiment, the array of cells is an array of static random access memory cells.

In an embodiment, a method for generating helper data for a PUF device with an array of cells comprises analyzing a plurality of groups of cells in the array of cells to find reliable groups of cells having sufficient reliable cells, outputting addresses of the reliable groups of cells in the array of cells, and storing the addresses of the reliable group of cells in the PUF device as the helper data for PUF response operations.

In an embodiment, the reliable groups of cells are reliable blocks of cells in the array of cells and analyzing the plurality of groups of cells includes examining each block of cells in the array of cells to determine whether the block of cells has sufficient number of reliable cells to be considered a reliable block of cells.

In an embodiment, the reliable groups of cells are reliable sub-blocks of cells of particular blocks of cells in the array of cells and analyzing the plurality of groups of cells includes examining each sub-block of cells in the array of cells to determine whether the sub-block of cells has sufficient number of reliable cells to be considered a reliable sub-block of cells.

In an embodiment, the reliable groups of cells are reliable sets of cells in sub-blocks of cells of particular blocks of cells in the array of cells and analyzing the plurality of groups of cells includes examining each set of cells in the array of cells to determine whether the set of cells has sufficient number of reliable cells to be considered a reliable set of cells.

In an embodiment, the sets of cells are pairs of cells in the sub-blocks of cells of the particular blocks of cells in the array of cells.

In an embodiment, each of the reliable groups of cells are cells positioned in the array of cells according to an offset pattern.

In an embodiment, some of the reliable groups of cells are positioned in the array of cells according to overlapping patterns.

In an embodiment, analyzing the plurality of groups of cells includes determining that a group of cells is a reliable group of cells when all the cells in the group are reliable.

In an embodiment, a PUF device comprises an array of cells, wherein each cell of the array generates an output signal, a reliable cell group detector coupled to the array of cells to find reliable sub-groups of cells of groups of cells in the array of cells and output addresses of the reliable sub-groups of cells, and a storage device coupled to the reliable cell group detector to store the addresses of the reliable sub-groups of cells to be used as helper data for PUF response operations.

In an embodiment, the reliable sub-groups of cells are reliable sub-blocks of cells of particular blocks of cells in the array of cells and the reliable cell group detector is configured to examine each sub-block of cells in the array of cells to determine whether the sub-block of cells has sufficient number of reliable cells to be considered a reliable sub-block of cells.

In an embodiment, the reliable cell group detector is configured to examine sets of cells in each sub-block of cells to find reliable sets of cells, and the number of reliable sets of cells in a sub-block of cells is used to determine whether the sub-block of cells is a reliable sub-block of cells.

These and other aspects in accordance with embodiments will become apparent from the following detailed description, taken in conjunction with the accompanying drawings, illustrated by way of example of the principles of the embodiments.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended FIGS. could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the embodiments is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
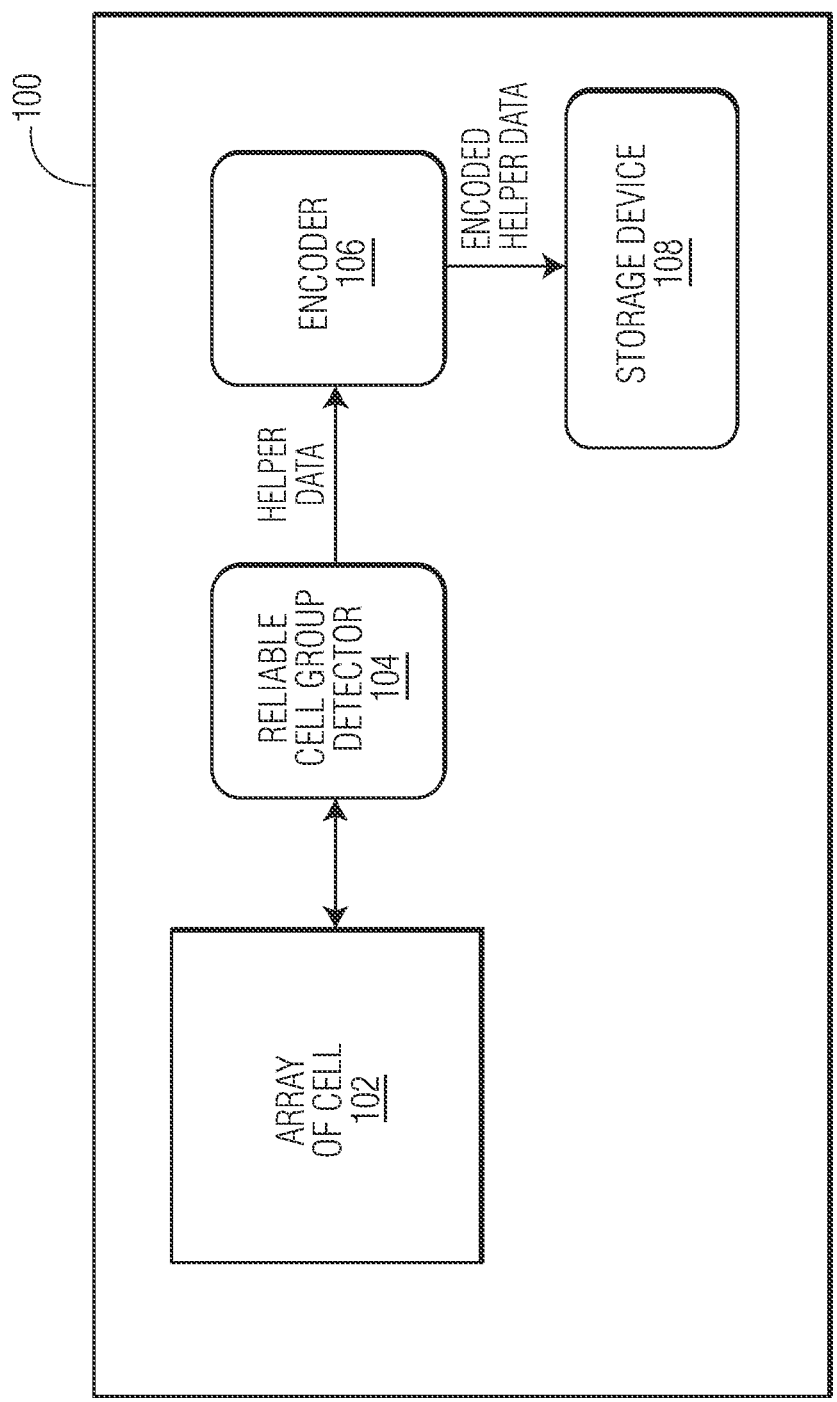
FIG. 1 is a block diagram of a physical unclonable function (PUF) device in accordance with an embodiment of the invention.

Turning now to FIG. 1, a physical unclonable function (PUF) device 100 in accordance with an embodiment of the invention is shown. The PUF device 100 includes an array 102 of cells, a reliable cell group detector 104, an encoder 106 and a storage device 108. The array 102 of cells is used as a PUF to generate a secure secret information. The cells of the array 102 may be any electrical components that generate analog output signals, which represent digital bits, in response to one or more input signals. As used herein, a reliable or good cell is a cell that generates a stable analog signal, which can be detected as a digital bit (0 or 1), repeatedly in response to the same input conditions. As an example, the cells of the array 102 may be computer memory cells, such as static random-access memory (SRAM) cells after power on. Using only the reliable cells in the array 102, the secure secret information can be repeatedly generated by applying input signals to the reliable cells of the array to sample the responses of the reliable cells, which can be viewed as a PUF response operation. As used herein, the addresses of these reliable cells in the array 102 of cells are called helper data. Thus, the helper data, as well as the input signals, are needed to generate the secure secret information using the reliable cells of the array 102 of cells.

The reliable cell group detector 104 operates to find groups of reliable cells in the array of cells and output the addresses of the reliable cells to be used as helper data. As described in detail below, the reliable cell group detector 104 may use blocks of cells, sub-blocks of cells (which may include sub-blocks of sub-blocks), and/or cells positioned in non-overlapping and overlapping patterns in the array 102 of cells to find suitable groups of reliable cells to reduce the size of the helper data. Thus, the amount of data to be stored on-chip in the storage device 108 can be significantly reduced.

The encoder 106 operates to encode the addresses of reliable cells, i.e., the helper data, determined by the reliable cell group detector 104. The encoder 106 may use any appropriate encoding scheme to encode the helper data.

The storage device 108 is used to store the encoded helper data, i.e., the encoded addresses of reliable cells. In an embodiment, the storage device 108 may be a set of one time programmable (OTP) fuses. However, in other embodiments, the storage device 108 may be another type of non-volatile memory, such as flash memory or EEPROM.

Figure 2:
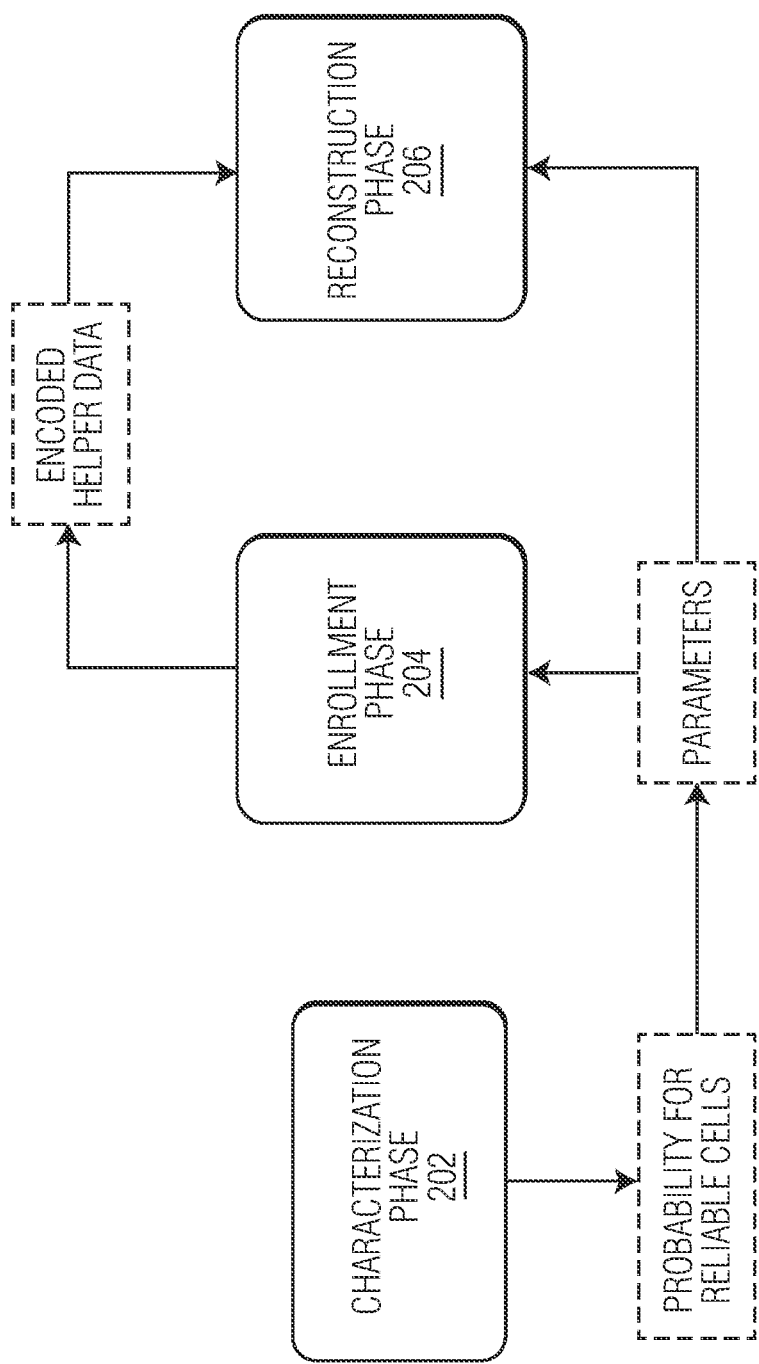
FIG. 2 is a high-level flow diagram of a process of using the PUF device depicted in FIG. 1 in accordance with an embodiment of the invention.

A high-level flow diagram of a process of using the PUF device 100 in accordance with an embodiment of the invention is illustrated in FIG. 2. As shown in FIG. 2, the process begins at a characterization phase 202, which involves analyzing the PUF device 100 to determine for each cell in the array 102 of cells the probability of being reliable. As an example, the characterization phase 202 may involve resampling the cells of the array 102 by repeatedly applying input signals to the cells of the array 102 to measure the response of the cells, e.g., the analog output signals of the cells, and looking at the distribution, or by "sampling" the cells of the array by comparing their signal levels to different level offsets.

The characterized probability of cells being reliable is then used to set parameters that will be used for an enrollment phase 204 and a reconstruction phase 206. The enrollment phase 204 is executed only once on the PUF device 100 to generate the helper data for the PUF device. The parameters used for the enrollment phase 204 include definitions for one or more groups of cells that will be used to generate helper data, as described in detail below. In some embodiments, the parameters may simply be the size of blocks and/or groups. In other embodiments, the parameters may be the sizes of blocks and/or groups and sub-blocks and/or sub-groups, as well as number, type and/or size of patterns. During the enrollment phase 204, addresses of select groups of reliable cells in the array 102 of the PUF device 100 are found and encoded to generate the encoded helper data, as previously described with respect to the reliable cell group detector 104 and the encoder 106 of the PUF device 100.

The encoded helper data is then used in the reconstruction phase 206 to generate secret information from the PUF device 100 using the encoded helper data and the same parameters used in the enrollment phase 204. During the reconstruction phase 206, the encoded helper data is decoded and then used to generate responses from the selected reliable cells in the array 102 of the PUF device 100. These responses or output signals represent the secret information. The reconstruction phase 206 may be executed any number of times when the secret information is needed from the PUF device 100.

In various embodiments of the invention, the reliable cell group detector 104 of the PUF device 100 uses predefined groups of cells in the array 102 of cells to find the groups with sufficient reliable cells. As described below, the reliable cell group detector 104 may look at blocks of cells, sub-blocks of cells (including sub-blocks of sub-blocks) and/or cells in patterns in the array 102 of cells to find the groups of reliable cells, which can reduce the size of the helper data, i.e., the addresses of the reliable cells.

Before embodiments with different levels and/or complexities of the invention are described, notations to see how much is really needed and what might not be enough will be discussed. In the discussion, a total number of N cells from which n good cells are needed will be examined, where N may be a power of 2 and n may not be a power of 2, but may be a multiple of a small power of 2. Powers of 2 make implementations usually easier but is otherwise not important or necessary. Each of the cells has a probability p to be good/reliable, which usually lies in the range of 0.5 to 0.9 but might also be less or more. Since good/reliable cells will yield good bits, the term "bits" and "cells" will be used herein interchangeably. In this description, notations that a pattern in the N cells will have m good bits (cells) in a block of M bits (cells), as well as a sub-pattern in a block will have k good bits in a sub-block of K bits, will be used. To get comparable numbers, an example of N=16 kilobits (Kb) =$2^{14}$ bit=2 kilobytes (KB) and n=256 will be used, which can be used in various devices, such as static random-access memory (SRAM) devices.

Let's start with a very extreme example of p=0.99. In this case, 2.56 noisy cells on average are expected if the first 256 cells are selected. That doesn't sound too bad. However, even in this case, up to 13 noisy cells on a 1 ppm level (ppm=parts per million=$10^{-6}$) are expected; the exact probability for 13 or more noisy cells in this case would be 2.51 ppm. Thus, there are still some possible errors to be corrected. For lower p that number increases significantly. For example, for p=0.9, one would already expect up to 51 noisy cells in the first 256 on a 1 ppm level; 25.6 on average. This would require a lot more bits to be able to use an error correcting code with 256 data bits and being able to correct more than 25 errors (or even up to 51), namely 256+207=463 (or even more; around 750 for 51 errors). However, then one would also expect again more noisy cells, namely roughly twice as many, which would need even larger codes, and so on.

So, the objective is to reduce the noise by selecting only good cells. The first two simple approaches are already described above: bitmap and bit addresses. An improvement over these two simple approaches is to look for good blocks of m bits in accordance with an embodiment of the invention. Each block now only has a probability of p to the power of m ($p^m$) to be good. The following table shows ern for various values of p and m.

| | m | | | | | |
|---|---|---|---|---|---|---|
| p | 2 | 4 | 6 | 8 | 12 | 16 |
| 0.5 | 0.250000 | 0.062500 | 0.015625 | 0.003906 | 0.000244 | 0.000015 |
| 0.55 | 0.302500 | 0.091506 | 0.027681 | 0.008373 | 0.000766 | 0.000070 |
| 0.6 | 0.360000 | 0.129600 | 0.046656 | 0.016796 | 0.002177 | 0.000282 |
| 0.65 | 0.422500 | 0.178506 | 0.075419 | 0.031864 | 0.005688 | 0.001015 |
| 0.7 | 0.490000 | 0.240100 | 0.117649 | 0.057648 | 0.013841 | 0.003323 |
| 0.75 | 0.562500 | 0.316406 | 0.177979 | 0.100113 | 0.031676 | 0.010023 |
| 0.8 | 0.640000 | 0.409600 | 0.262144 | 0.167772 | 0.068719 | 0.028147 |

-continued

| | | | m | | | |
|---|---|---|---|---|---|---|
| p | 2 | 4 | 6 | 8 | 12 | 16 |
| 0.85 | 0.722500 | 0.522006 | 0.377150 | 0.272491 | 0.142242 | 0.074251 |
| 0.9 | 0.810000 | 0.656100 | 0.531441 | 0.430467 | 0.282430 | 0.185302 |

This implies again that more blocks are needed to find enough good ones, where n/m good blocks are needed. And, if a 1 ppm level of not finding enough blocks is targeted, the following numbers of total bits/cells for various combinations of p and in in the following table are needed.

| | 2 | 4 | 6 | 8 | 12 | 16 |
|---|---|---|---|---|---|---|
| 0.5 | 1448 | 6912 | 31234 | 135840 | 2548372 | 44685888 |
| 0.55 | 1184 | 4692 | 17578 | 63296 | 811864 | 9724816 |
| 0.6 | 984 | 3284 | 10378 | 31488 | 285652 | 2416752 |
| 0.65 | 826 | 2356 | 6376 | 16528 | 109204 | 671328 |
| 0.7 | 702 | 1728 | 4042 | 9072 | 44764 | 204960 |
| 0.75 | 600 | 1284 | 2632 | 5168 | 19456 | 67824 |
| 0.8 | 516 | 968 | 1744 | 3024 | 8860 | 24016 |
| 0.85 | 446 | 732 | 1168 | 1800 | 4180 | 8960 |
| 0.9 | 384 | 556 | 784 | 1080 | 2008 | 3456 |

So, for p=0.7, one could take 8-bit blocks. This would require 256/8=32 such blocks out of 2^14/8=2^11, which would require 11 address bits per block, so 32×11=352. For p=0.6, one could only take 6-bit blocks (which is not nice to implement). This would require 256/6=43 such blocks out of 2^14/6=2730, which would need 12 address bits and hence 43×12=516 bits. For p=0.5, one could only take 4-bit blocks. This would require 256/4=64 such blocks out of 2^14/4=2^12, which would need 12 address bits and hence 64×12=768 bits.

In another embodiment of the invention, one could split the cells into blocks of in cells and then look for sub-blocks of K bits in them. As an example, the cells can be split into blocks of 64 cells and then look for 4 sub-blocks of 4 bits in them. That would imply 8-bit addresses for the block (2^14/64=2^8=256 blocks) and 4 times 4-bit addresses for the sub-blocks (64/4=16=2^4). One would need 256/16=16 such blocks and hence 16×(8+4×4)=384 bit in total. So, one can see that this is more than one would need above for p=0.7, but less than what one would need for p=0.6 or 0.5. However, how low (for p) could one get with this approach? For each sub-block, the probability for being good is q:=p^4, and for each block, it would be Q:=1−pBinomial(3, 16, q), where pBinomial is the cumulative binomial distribution (like in Excel or R). Hence, in total, one would get a "fail" probability of pBinomial(15, 256, Q):

| p | 0.500 | 0.525 | 0.550 | 0.575 | 0.600 | 0.625 | 0.650 |
|---|---|---|---|---|---|---|---|
| q | 0.063 | 0.076 | 0.092 | 0.109 | 0.130 | 0.153 | 0.179 |
| Q | 0.015 | 0.029 | 0.052 | 0.089 | 0.144 | 0.219 | 0.316 |
| FailProb | 1.000 | 0.996 | 0.735 | 0.049 | 1.40E−05 | 1.39E−12 | 3.69E−24 |

As shown in the above table, one could come down to almost p=0.6 on a 1 ppm level, or more exactly p=0.606.

Figure 3:
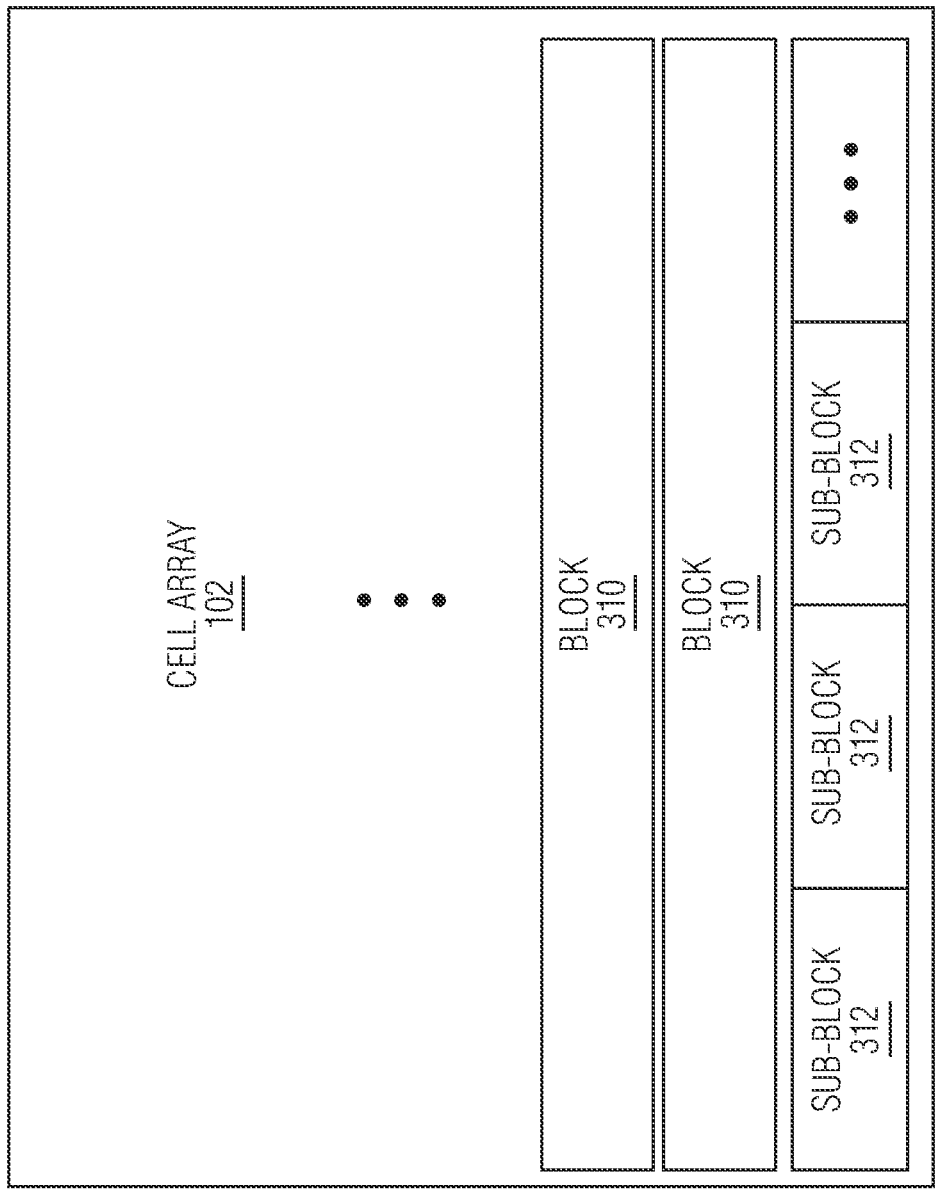
FIG. 3 illustrates an array of cells of the PUF device depicted in FIG. 1 that has been divided into blocks of cells and then sub-blocks of cells in accordance with an embodiment of the invention.

FIG. 3 illustrates the array 102 of cells of the PUF device 100 that has been divided into blocks of cells and then sub-blocks of cells in accordance with an embodiment of the invention. As shown in FIG. 3, the array 102 of cells is separated into blocks 310 of cells. Each block 310 is then divided into a number of sub-blocks 312 of cells. Each sub-block 312 can be determined to be either a reliable sub-block or not by the reliable cell group detector 104 of the PUF device 100. In an embodiment, a sub-block is determined to be a reliable sub-block if all the cells in the sub-block are reliable. These determinations regarding the sub-blocks 312 of each block 310 are then used to determine whether the block is reliable by the reliable cell group detector 104. In an embodiment, a block is determined to be reliable if the block has sufficient number of reliable sub-blocks, which means that the block has sufficient number of reliable cells. The addresses of the reliable sub-blocks in the reliable blocks can then be used as helper data by the reliable cell group detector 104.

In an embodiment of the invention, one could even improve the encoding further by using relative addresses to the previous block or sub-block. If the addressing starts after the largest gap (using wrap-around), one bit per relative address can be saved. This would end up with only 8+4+3×3+15×(7+4+3×3)=321 bit, which is about 83.6% from the full address solution described above.

Figure 4:
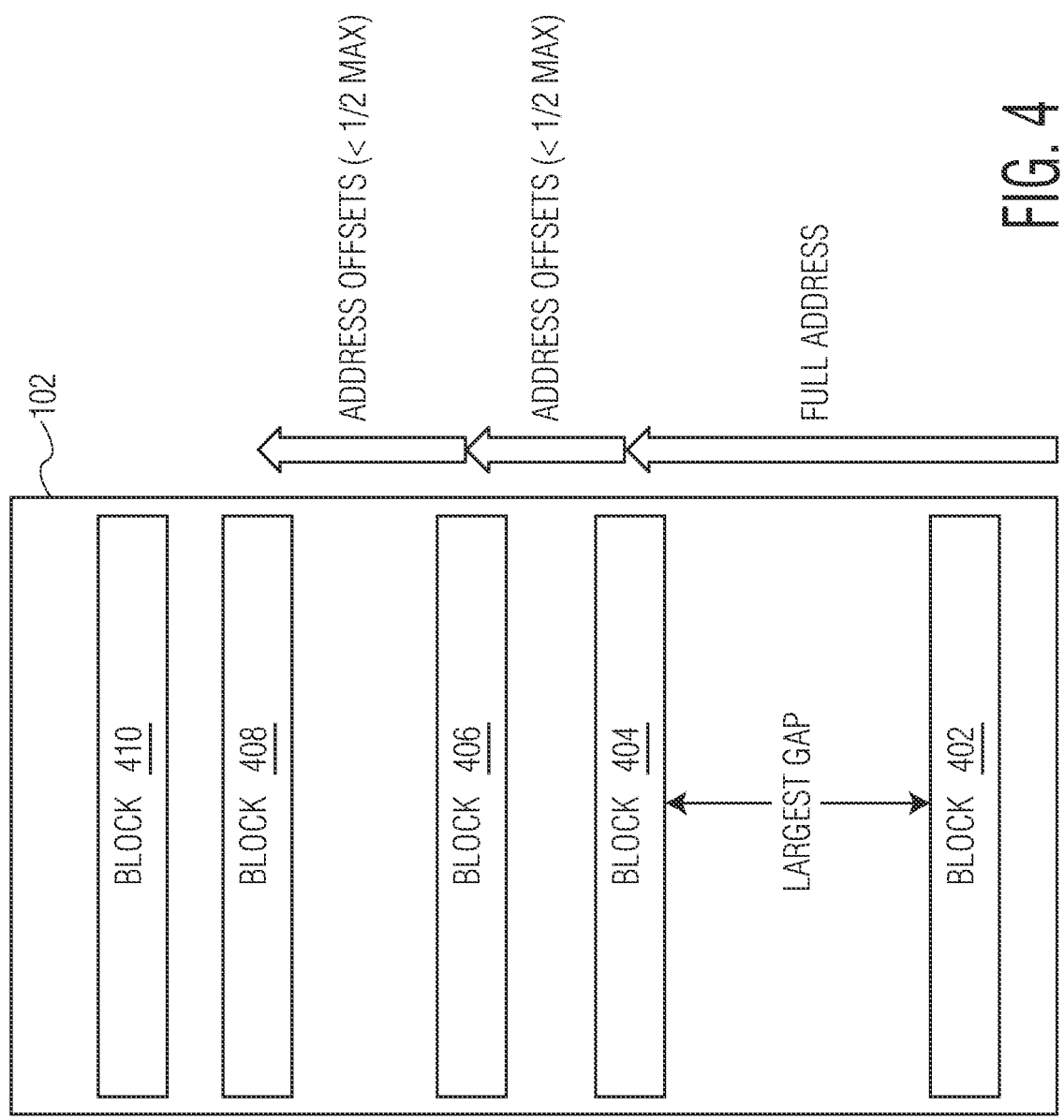
FIG. 4 illustrates how relative addresses can be used to save bits for the addresses of the blocks or sub-blocks in the array of cells of the PUF device depicted in FIG. 1 in accordance with an embodiment of the invention.

FIG. 4 illustrates how relative addresses can be used to save bits for the addresses of the blocks or sub-blocks in the array 102 of cells in accordance with an embodiment of the invention. In FIG. 4, blocks are used to illustrate the use of relative address. However, the same technique may be used for sub-blocks as well. In the illustrated embodiment of FIG. 4, five (5) blocks 402, 404, 406, 408 and 410 are shown to be included in the array 102 of cells. As shown in FIG. 4, full addresses are used for the blocks 402 and 404, where the block 404 is the first block after the largest gap. For the block 406, the relative address to the block 404 is used for its address. The address offset that is used for the address of the block 406 is less than ½ max. For the block 408, the relative address to the block 406 is used for its address. The address offset that is used for the address of the block 408 is again less than ½ max. Similar technique can be used for the address of the block 410.

In another embodiment, different sizes may be used for the blocks. As an example, the $2^{14}$ bits may be split into one hundred twenty-eight (128) 128-bit blocks and four (4) 4-bit sub-blocks are used for each block. Like above, 369 bits in total is now needed. Failure probabilities are listed in the following table for different p values.

| p | 0.5 | 0.51 | 0.52 | 0.53 | 0.54 | 0.55 | 0.56 |
|---|---|---|---|---|---|---|---|
| q | 0.063 | 0.068 | 0.073 | 0.079 | 0.085 | 0.092 | 0.098 |
| Q | 0.137 | 0.168 | 0.203 | 0.243 | 0.288 | 0.336 | 0.387 |
| FailProb | 0.310 | 0.074 | 7.47E−03 | 2.79E−04 | 3.36E−06 | 1.16E−08 | 1.01E−11 |

As shown in the above table, one could come down to p=0.55 on a 1 ppm level.

Figure 5:
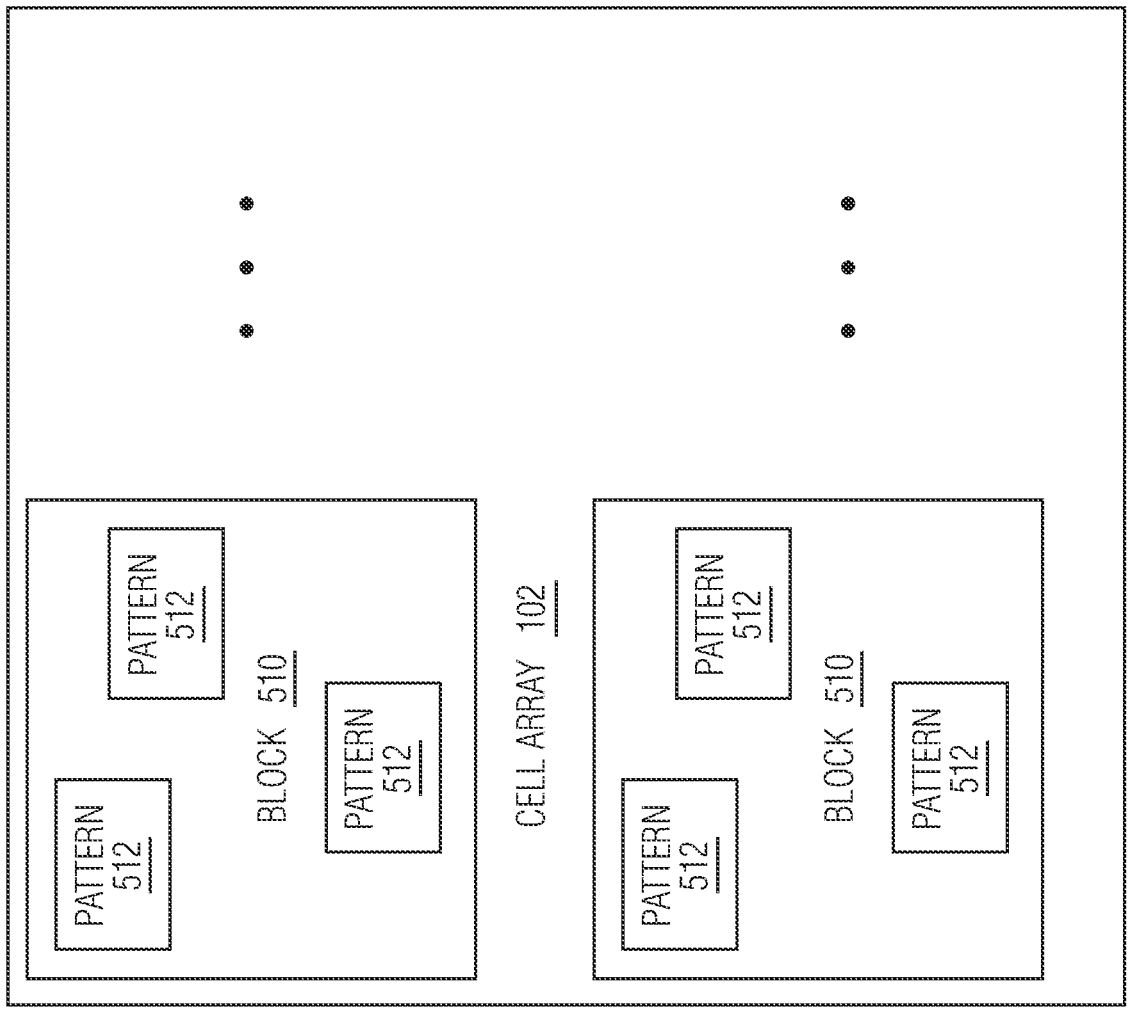
FIG. 5 illustrates the array of cells of the PUF device depicted in FIG. 1 that has been divided into blocks of cells and then patterns of cells in accordance with an embodiment of the invention.

In the above embodiments, sub-blocks are used to determine reliable blocks. However, in other embodiments, different groups of cells in each block of cells may be used instead. Each group of cells may be cells in a particular pattern in a block of cells, where the particular pattern is defined by relative positions of the cells in the block of cells. FIG. 5 illustrates how the array 102 of cells of the PUF device 100 that has been divided into blocks of cells and then patterns of cells in accordance with an embodiment of the invention. As shown in FIG. 5, the array 102 of cells is separated into blocks 510 of cells. Each block 510 can then be divided into a number of patterns 512 of cells. Each pattern 512 of cells can be determined to be either a reliable pattern or not by the reliable cell group detector 104 of the PUF device 100. In an embodiment, a pattern of cells is determined to be a reliable pattern if all the cells in the pattern are reliable. These determinations regarding the patterns 512 of each block 510 are then used to determine whether the block is reliable by the reliable cell group detector 104. In an embodiment, a block is determined to be reliable if the block has sufficient number of reliable patterns. The addresses of the reliable patterns in the reliable blocks can then be used as helper data by the reliable cell group detector 104.

In another embodiment, a 3-level approach may be used. As an example, the $2^{14}$ bits may be split into thirty-two (32) 512-bit blocks and each of the blocks may again be split into thirty-two (32) 16-bit sub-blocks. In each sub-block, the goal is to find four (4) bit-pairs, which can be easily encoded by 8 or only 7 bits by simply indicating with each bit if the corresponding bit-pair should be used or not. If the first 7 of those 8 bits are known, then the $8^{th}$ bit is already known, and thus, is not needed. In each block, eight (8) sub-blocks are selected with the relative addressing technique explained above, which needs 5+7×4 bits. And on the top level, four (4) out of twenty-two (32) blocks need to be selected, which needs 5+3×4 bits. In total, there are 5+3×4+4×(5+7×4+8×7)=373 bits. The probabilities for this approach are as follows: each bit-pair is good with probability $p^2$ and each sub-block is good with probability q:=1− pBinomial(3, 8, $p^2$). Hence, each block is good with probability Q:=1−pBinomial(7, 32, q) and the failure probability is pBinomial(3, 32, Q). Failure probabilities are listed in the following table for different p values.

| p | 0.5 | 0.51 | 0.52 | 0.53 | 0.54 | 0.55 | 0.56 | 0.57 | 0.58 |
|---|---|---|---|---|---|---|---|---|---|
| q | 0.114 | 0.128 | 0.144 | 0.161 | 0.179 | 0.199 | 0.219 | 0.242 | 0.265 |
| Q | 0.024 | 0.045 | 0.079 | 0.131 | 0.203 | 0.295 | 0.405 | 0.524 | 0.642 |
| FailProb | 0.993 | 0.946 | 0.754 | 0.383 | 0.088 | 6.44E−03 | 1.13E−04 | 3.58E−07 | 1.61E−10 |

With this approach, one could come down to p=0.57 on a 1 ppm level.

In the above embodiments, only non-overlapping patterns were used, which is easier to analyze because they can be assumed to be independent. In an embodiment, overlapping patterns may be used to find good cells. However, if the patterns are overlapping, the computations get a lot more complex and it might be easier to do some Monte-Carlo simulations for them. Let's take the second example from above, where there are one hundred twenty-eight (128) 128-bit blocks. In this example, the search is for possible 16-bit patterns in these blocks. Since there are 64C16 (where C is combination)=~2^48.8 possible 16-bit patterns, let's try to find a set with some that are not too much overlapping. Again, since to find a complete good 16-bit pattern might take some time, it is better to split this again into four (4) 4-bit patterns. However, instead of simply taking consecutive four (4) bits, one can take different patterns that do not overlap so much, such that one could also start at each bit position and not only at each fourths. One can take the following two offset-patterns (added to the pattern start-address modulo the block size):

1) 0, 1, 3, 7
2) 0, 15, 31, 63

So, for each 4-bit pattern, there is a 7-bit start address and 1-bit pattern selection. Again, all but the first start address can be encoded with one bit less as differences. So, one would need in total 7+15×6+16×(8+3×7)=561 bits, which means that the probability could now come down to p=—0.32 (estimated by simulation).

Thus, depending on the characterization of the array 102 of cells in the PUF device 100, i.e., the probability of reliable cells, an appropriate approach from the approaches described above can be used to find reliable cells in the array and use their addresses as helper data. One approach may be to split the array 102 of cells in the PUF device 100 into only groups of cells, such as blocks or patterns, where the addresses of the reliable groups of cells are used as helper data. Other approaches may be to split the array 102 of cells in the PUF device 100 into groups of cells, and then into one or more sub-groups of cells (including any sets of cells), where the addresses of the smallest reliable sub-groups are used as helper data. The sub-groups of cells may be blocks of cells, patterns of cells or any sets of cells. The exact groups of cells that are used to generate the helper data are the parameters used for the enrollment phase.

Figure 6:
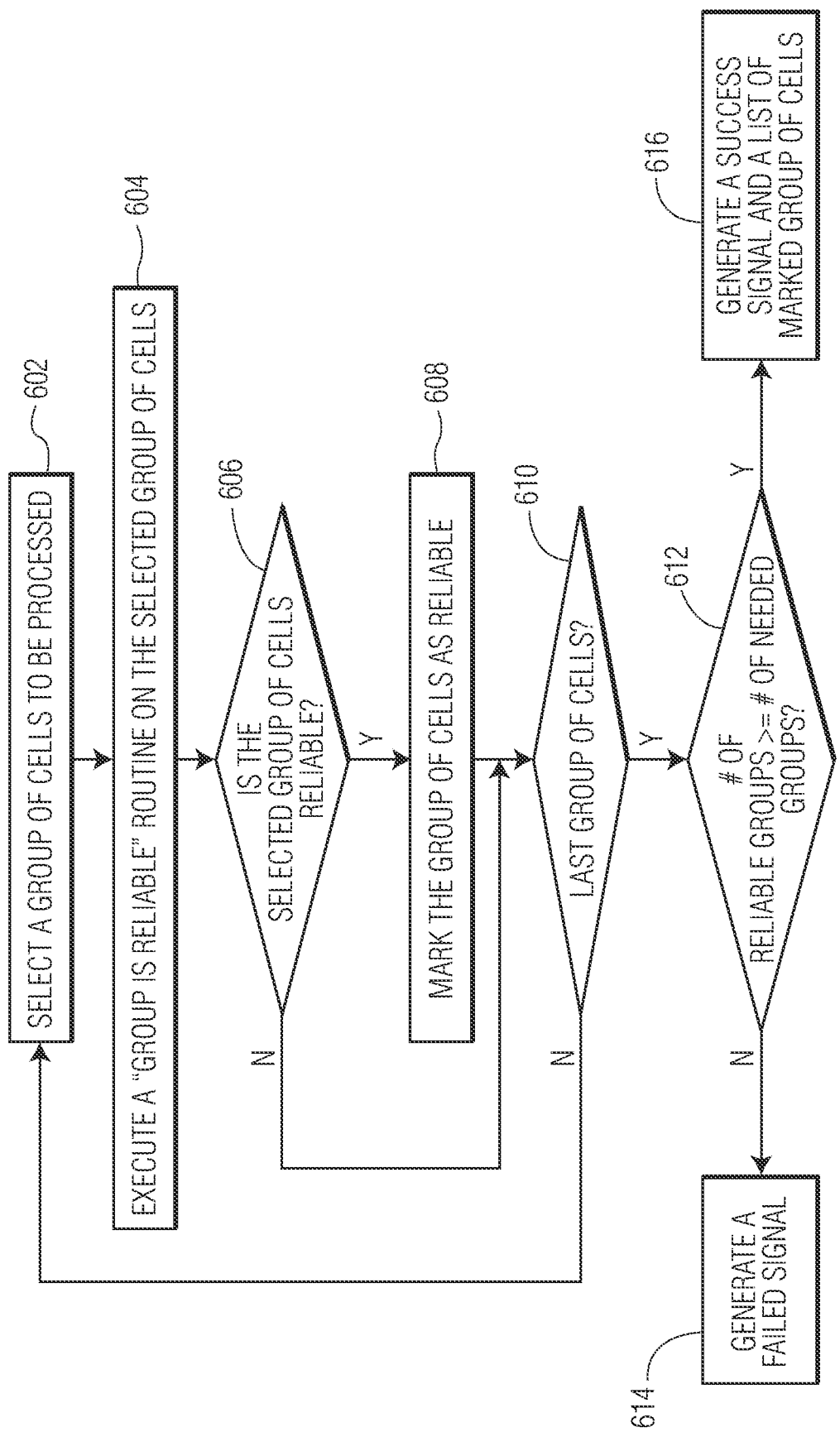
FIG. 6 is a flow diagram of a process of finding reliable groups of cells in the array of cells in the PUF device depicted in FIG. 1 by a reliable cell group detector of the PUF device in accordance with an embodiment of the invention.

A process of finding reliable groups of cells in the array 102 of cells in the PUF device 100 by the reliable cell group detector 104 of the PUF device in accordance with an embodiment of the invention is now described with reference to FIG. 6. The process begins at step 602, where a group of cells in the array 102 of cells is selected to be processed. As an example, the group of cells may be a block of cells or a pattern of cells in the array of cells.

Next, at step 604, a "group is reliable" routine is executed on the selected group of cells to analyze whether the group of cells is reliable. The "group is reliable" routine is described below with reference to FIG. 7.

Next, at step 606, a determination is made whether the selected group of cells is reliable. If the selected group of cells is determined to be reliable, then the process proceeds to step 608, where the selected group of cells is marked as being reliable. The process then proceeds to step 610. However, if the selected group of cells is determined to be not reliable, then the process proceeds directly to step 610.

At step 610, a determination is made whether the current group of cells is the last group of cells for the array 102 of cells. If no, then the process proceeds back to step 602 to select another group of cells in the array 102 of cells. If yes, then the process proceeds to step 612.

At step 612, a determination is made whether the number of reliable groups of cells is equal to or greater than the number of needed groups of cells to get sufficient number of reliable cells. If no, then a failure signal is generated, at step 614. If yes, then a success signal and a list of marked groups of cells are generated, at step 616.

Figure 7:
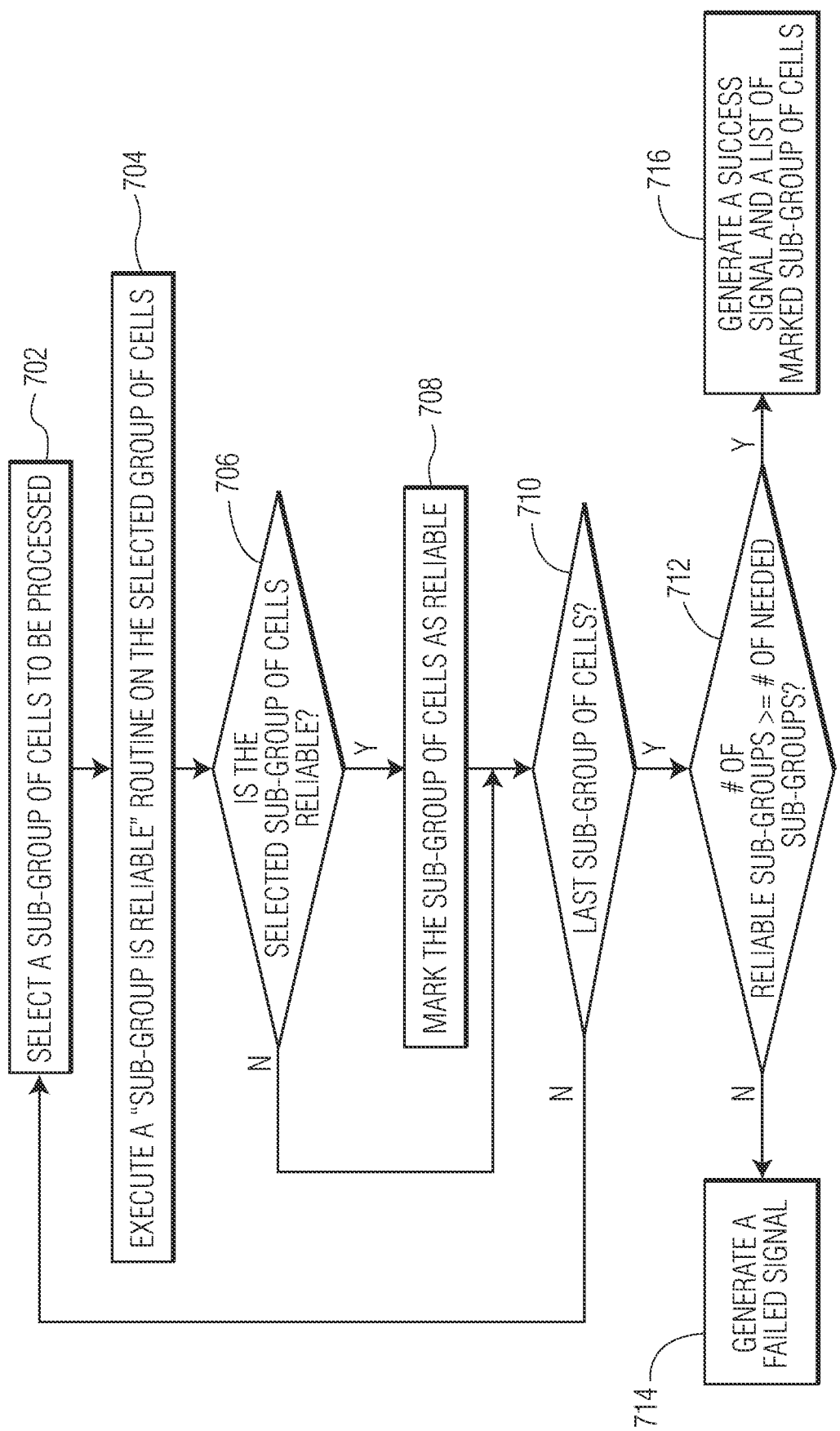
FIG. 7 is a flow diagram of a "group is reliable" routine used in the process depicted in FIG. 6 in accordance with an embodiment of the invention.

Turning now to FIG. 7, a flow diagram of the "group is reliable" routine in accordance with an embodiment of the invention is shown. As shown in FIG. 7, the "group is reliable" routine begins at step 702, where a sub-group of cells in a current block of cells is selected to be processed. As an example, the sub-group of cells may be a sub-block of cells or a sub-pattern of cells in the array 102 of cells. The selected sub-group may be a sub-group of a sub-group.

Next, at step 704, a "sub-group is reliable" routine is executed on the selected sub-group of cells to analyze whether the sub-group of cells is reliable. The "sub-group is reliable" routine is described below with reference to FIG. 8.

Next, at step 706, a determination is made whether the selected sub-group of cells is reliable. If the selected sub-group of cells is determined to be reliable, then the process proceeds to step 708, where the selected sub-group of cells is marked as being reliable. The process then proceeds to step 710. However, if the selected sub-group of cells is determined to be not reliable, then the process proceeds directly to step 710.

At step 710, a determination is made whether the current sub-group of cells is the last sub-group of cells for the current group of cells. If no, then the process proceeds back to step 702 to select another sub-group of cells in the group of cells. If yes, then the process proceeds to step 712.

At step 712, a determination is made whether the number of reliable sub-groups of cells is equal to or greater than the number of needed sub-groups of cells for the current group of cells to get sufficient number of reliable cells. If no, then a failure signal is generated, at step 714. If yes, then a success signal and a list of marked sub-groups of cells are generated, at step 716.

Figure 8:
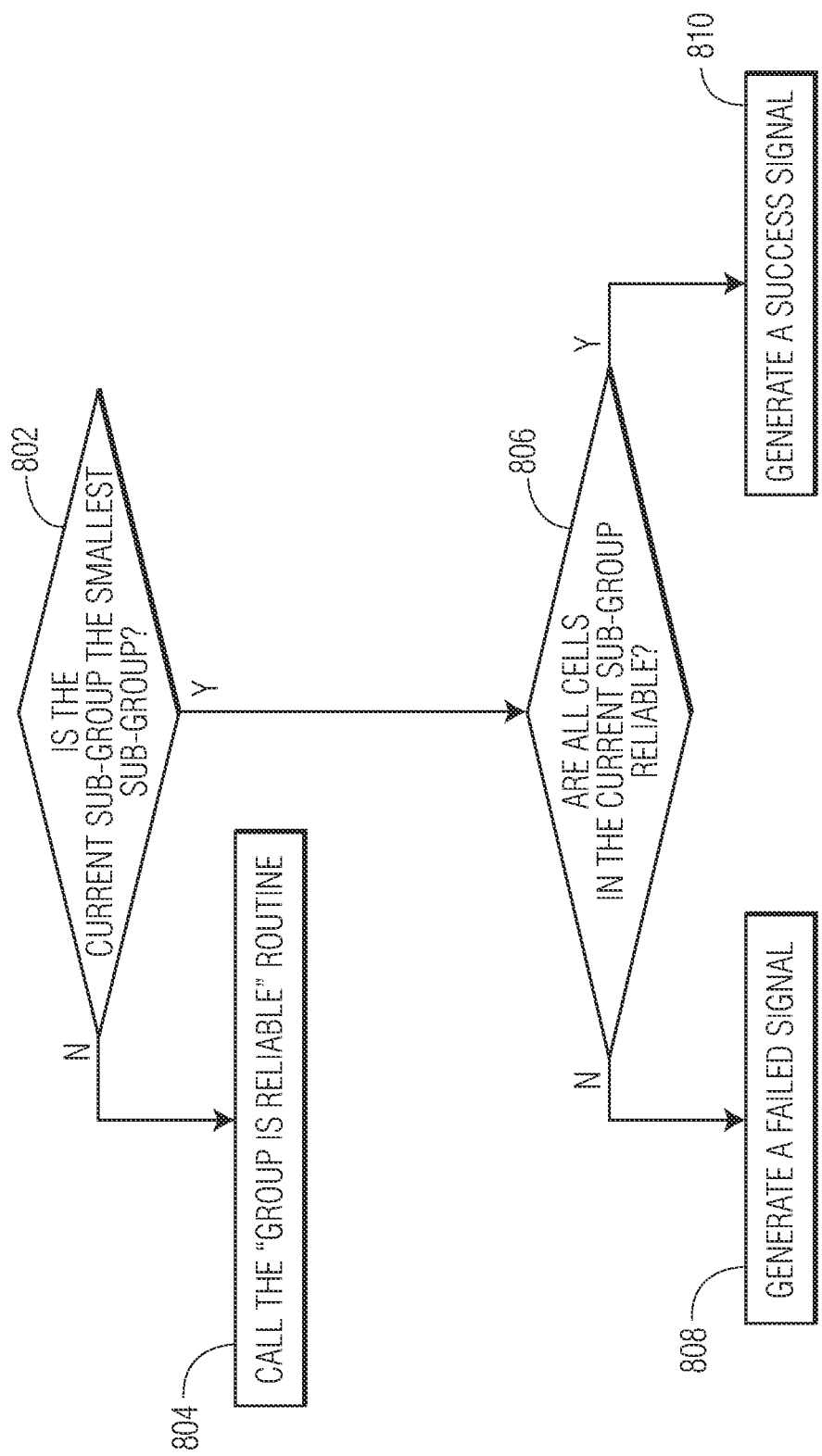
FIG. 8 is a flow diagram of a "sub-group is reliable" routine used in the "group is reliable" routine depicted in FIG. 7 in accordance with an embodiment of the invention.

Turning now to FIG. 8, a flow diagram of the "sub-group is reliable" routine in accordance with an embodiment of the invention is shown. As shown in FIG. 8, the "sub-group is reliable" routine begins at step 802, a determination is made whether the current sub-group of a current group (where the current group may be a sub-group or even lower sub-group, e.g., a sub-sub-group) is the smallest sub-group defined in the parameters for the enrollment phase 204. If the current sub-group is not the smallest sub-group, then the routine proceeds to step 804, where the "group is reliable" routine is called to execute the routine on the current sub-group of the current group. However, if the current sub-group is the smallest sub-group, then the routine proceeds to step 806, where a determination is made whether all the cells in the smallest sub-group are reliable. If not all cells are reliable, then a failure signal is generated, at step 808. If all the cells are reliable, then a success signal is generated, at step 810.

The process of finding reliable groups of cells described above may be implemented using different algorithms. A pseudo-code for a particular implementation of the process in accordance with an embodiment of the invention is shown below.

```
FindGoodGroups:
    loop over groups:
        if GroupIsReliable:
            mark group
        if #reliable group >= #needed group:
            return success & list of marked group
        else
            return fail
GroupIsReliable:
    loop over sub-groups:
        if SubIsReliable:
            mark sub-group
        if #reliable sub-group >= #needed sub-groups per group:
            return success & list of marked sub-groups
        else
            return fail
SubIsReliable:
    recursive call to GroupIsReliable as needed with smaller size
    On lowest level:
        If all cells are reliable:
            return success
        else
            return fail
```

Figure 9:
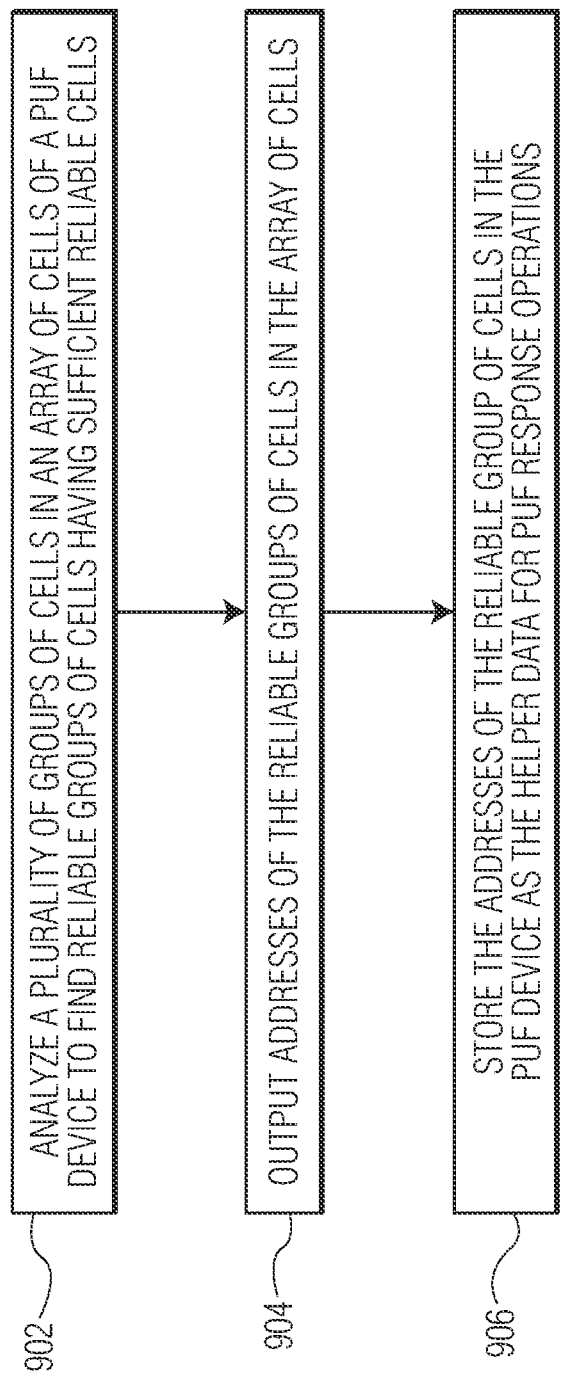
FIG. 9 is a process flow diagram of a method for generating helper data for a PUF device with an array of cells in accordance with an embodiment of the invention.

A method for generating helper data for a PUF device with an array of cells in accordance with an embodiment of the invention is described with reference to a process flow diagram of FIG. 9. At block 902, a plurality of groups of cells in the array of cells is analyzed to find reliable groups of cells having sufficient reliable cells. As an example, the groups of cells may be blocks of cells, sub-groups of cells, patterns of cells, or sub-patterns of cells. At block 904, addresses of the reliable groups of cells in the array of cells are outputted. At block 906, the addresses of the reliable group of cells are stored in the PUF device as the helper data for PUF response operations, such as generating secret information.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It can also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments that use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A physical unclonable function (PUF) device comprising:
    an array of cells, wherein each cell of the array generates an output signal;
    a reliable cell group detector coupled to the array of cells to find reliable groups of cells in the array of cells having sufficient reliable cells and output addresses of the reliable groups of cells; and
    a storage device coupled to the reliable cell group detector to store the addresses of the reliable groups of cells to be used as helper data for PUF response operations.

2. The PUF device of claim 1, wherein the reliable groups of cells are reliable blocks of cells in the array of cells and wherein the reliable cell group detector is configured to examine each block of cells in the array of cells to determine whether the block of cells has sufficient number of reliable cells to be considered a reliable block of cells.

3. The PUF device of claim 1, wherein the reliable groups of cells are reliable sub-blocks of cells of particular blocks of cells in the array of cells and wherein the reliable cell group detector is configured to examine each sub-block of cells in the array of cells to determine whether the sub-block of cells has sufficient number of reliable cells to be considered a reliable sub-block of cells.

4. The PUF device of claim 1, wherein the reliable groups of cells are reliable sets of cells in sub-blocks of cells of particular blocks of cells in the array of cells and wherein the reliable cell group detector is configured to examine each set of cells in the array of cells to determine whether the set of cells has sufficient number of reliable cells to be considered a reliable set of cells.

5. The PUF device of claim 4, wherein the sets of cells are pairs of cells in the sub-blocks of cells of the particular blocks of cells in the array of cells.

6. The PUF device of claim 1, wherein each of the reliable groups of cells are cells positioned according to an offset pattern.

7. The PUF device of claim 1, wherein some of the reliable groups of cells are positioned according to overlapping patterns.

8. The PUF device of claim 1, wherein the reliable cell group detector determines that a group of cells is a reliable group of cells when all the cells in the group are reliable.

9. The PUF device of claim 1, wherein the array of cells is an array of static random access memory cells.

10. A method for generating helper data for a physical unclonable function (PUF) device with an array of cells, the method comprising:
    analyzing a plurality of groups of cells in the array of cells to find reliable groups of cells having sufficient reliable cells;
    outputting addresses of the reliable groups of cells in the array of cells; and
    storing the addresses of the reliable group of cells in the PUF device as the helper data for PUF response operations.

11. The method of claim 10, wherein the reliable groups of cells are reliable blocks of cells in the array of cells and wherein analyzing the plurality of groups of cells includes examining each block of cells in the array of cells to determine whether the block of cells has sufficient number of reliable cells to be considered a reliable block of cells.

12. The method of claim 10, wherein the reliable groups of cells are reliable sub-blocks of cells of particular blocks of cells in the array of cells and wherein analyzing the plurality of groups of cells includes examining each sub-block of cells in the array of cells to determine whether the sub-block of cells has sufficient number of reliable cells to be considered a reliable sub-block of cells.

13. The method of claim 10, wherein the reliable groups of cells are reliable sets of cells in sub-blocks of cells of particular blocks of cells in the array of cells and wherein analyzing the plurality of groups of cells includes examining each set of cells in the array of cells to determine whether the set of cells has sufficient number of reliable cells to be considered a reliable set of cells.

14. The method of claim 13, wherein the sets of cells are pairs of cells in the sub-blocks of cells of the particular blocks of cells in the array of cells.

15. The method of claim 10, wherein each of the reliable groups of cells are cells positioned in the array of cells according to an offset pattern.

16. The method of claim 10, wherein some of the reliable groups of cells are positioned in the array of cells according to overlapping patterns.

17. The method of claim 10, wherein analyzing the plurality of groups of cells includes determining that a group of cells is a reliable group of cells when all the cells in the group are reliable.

18. A physical unclonable function (PUF) device comprising:
an array of cells, wherein each cell of the array generates an output signal;
a reliable cell group detector coupled to the array of cells to find reliable sub-groups of cells of groups of cells in the array of cells and output addresses of the reliable sub-groups of cells; and
a storage device coupled to the reliable cell group detector to store the addresses of the reliable sub-groups of cells to be used as helper data for PUF response operations.

19. The PUF device of claim 18, wherein the reliable sub-groups of cells are reliable sub-blocks of cells of particular blocks of cells in the array of cells and wherein the reliable cell group detector is configured to examine each sub-block of cells in the array of cells to determine whether the sub-block of cells has sufficient number of reliable cells to be considered a reliable sub-block of cells.

20. The PUF device of claim 19, wherein the reliable cell group detector is configured to examine sets of cells in each sub-block of cells to find reliable sets of cells, and wherein the number of reliable sets of cells in a sub-block of cells is used to determine whether the sub-block of cells is a reliable sub-block of cells.

* * * * *